United States Patent [19]

Sheffer et al.

[11] Patent Number: 5,665,019
[45] Date of Patent: Sep. 9, 1997

[54] CHAIN GUIDE MOUNTING ASSEMBLY FOR THE REDUCTION OF CHAIN INDUCED NOISE AND VIBRATION IN A CHAIN DRIVEN OVERHEAD CAM INTERNAL COMBUSTION ENGINE

[75] Inventors: Eric J. Sheffer, Highland; William H. Osborne, Southfield; Wayne A. Nowicki, Ypsilanti, all of Mich.

[73] Assignee: Ford Global Technologies, Inc., Dearborn, Mich.

[21] Appl. No.: 598,832

[22] Filed: Feb. 5, 1996

[51] Int. Cl.⁶ .................. F16H 7/08; F16H 7/00; F16H 7/18; F16H 7/24
[52] U.S. Cl. .................. 474/111; 474/140; 474/148; 474/150
[58] Field of Search .................. 474/96, 111, 140, 474/148, 150, 273, 902; 226/196, 198

[56] References Cited

U.S. PATENT DOCUMENTS

| | | |
|---|---|---|
| 2,613,544 | 10/1952 | Cullman . |
| 3,128,999 | 4/1964 | Schmitt . |
| 3,180,594 | 4/1965 | Connell . |
| 3,322,377 | 5/1967 | Morlon . |
| 3,482,808 | 12/1969 | Rofe et al. . |
| 3,728,793 | 4/1973 | Makinson et al. . |
| 3,845,827 | 11/1974 | Schulin . |
| 3,868,190 | 2/1975 | Moore ............ 403/189 |
| 3,972,119 | 8/1976 | Bailey . |
| 4,049,308 | 9/1977 | Martin . |
| 4,069,719 | 1/1978 | Cancilla . |
| 4,480,603 | 11/1984 | Tsuboi ............ 123/90.31 |
| 4,480,608 | 11/1984 | Valev . |
| 4,670,985 | 6/1987 | Biersteker ............ 30/381 |
| 5,058,867 | 10/1991 | Hadano et al. . |
| 5,445,365 | 8/1995 | Forderer . |

Primary Examiner—Tamara L. Graysay
Assistant Examiner—Gary S. Hartmann
Attorney, Agent, or Firm—Neil P. Ferraro

[57] ABSTRACT

A chain guide mounting assembly for reducing chain related noise in a chain driven overhead cam internal combustion engine. The assembly includes vibration isolation means for mounting the chain guide to the engine. Resilient members, fitted within the chain guide, provide the vibration isolation, which, in turn, reduces undesirable chain noise. To prevent undue lateral movement of the chain guide member as a result of the chain force exerted thereon, a rigid sleeve in interference engagement is fitted within bores of the resilient members. As a result, a preload is provided on the resilient members so as to reduce the amount of undesirable lateral movement.

19 Claims, 3 Drawing Sheets

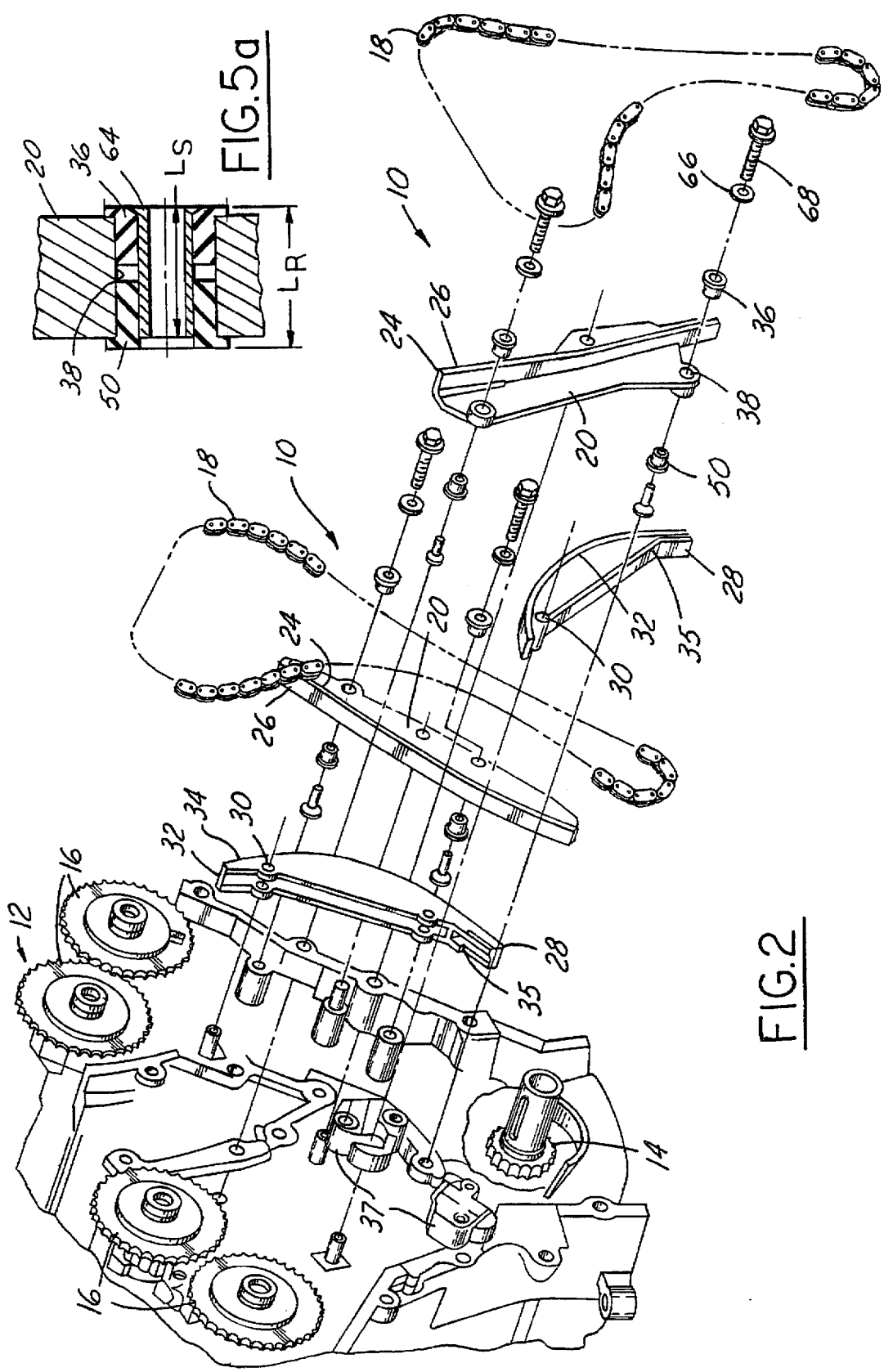

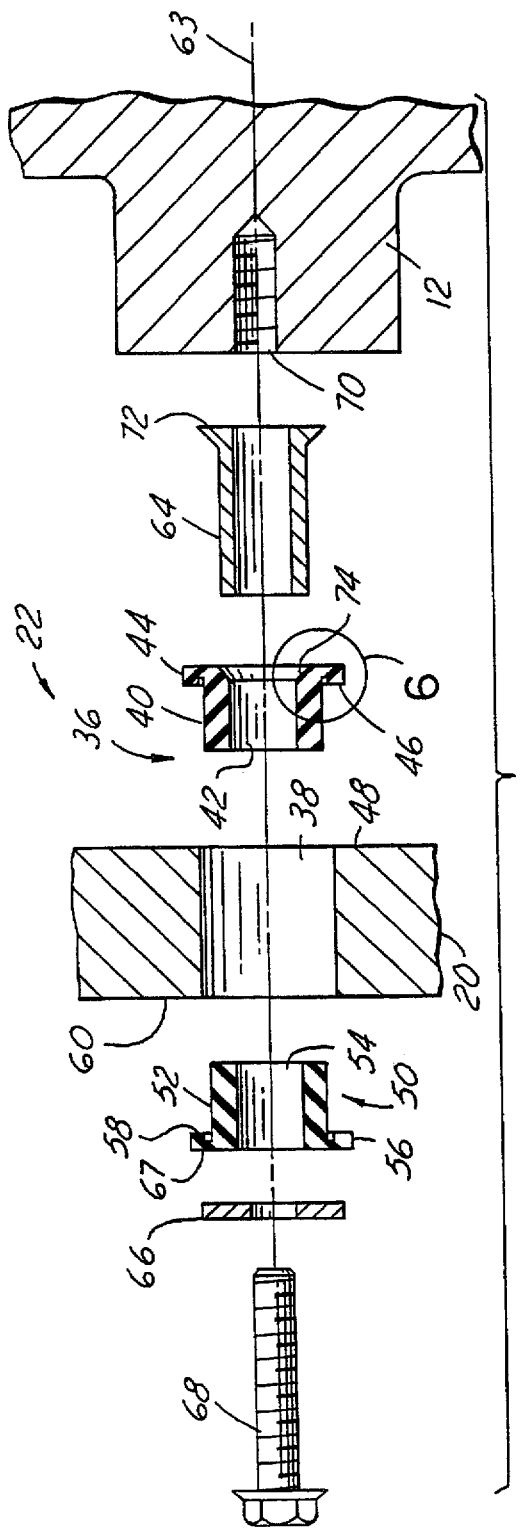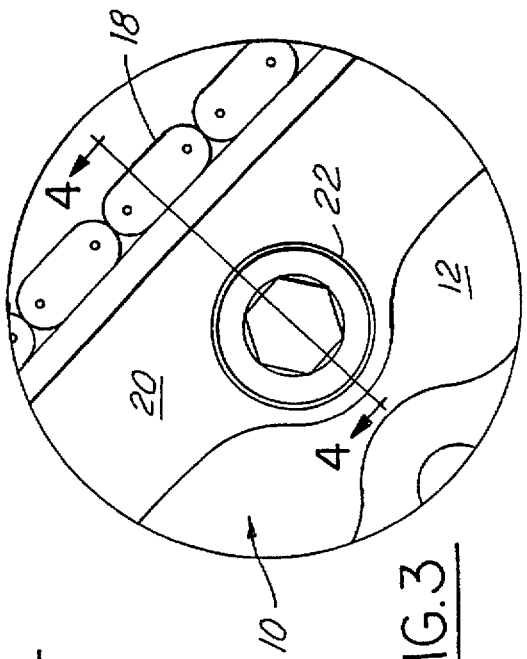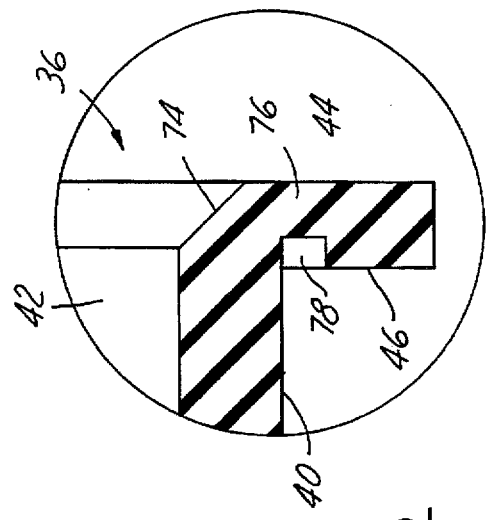

CHAIN GUIDE MOUNTING ASSEMBLY FOR THE REDUCTION OF CHAIN INDUCED NOISE AND VIBRATION IN A CHAIN DRIVEN OVERHEAD CAM INTERNAL COMBUSTION ENGINE

FIELD OF THE INVENTION

The present invention relates to a chain guide mounting assembly for a chain driven overhead cam internal combustion engine, and more particularly to, an assembly which reduces propagation of chain related noise throughout the engine.

BACKGROUND OF THE INVENTION

Automotive engineers have placed continued emphasis on the reduction of vehicle noise, vibration and harshness (NVH) to ensure a smooth vehicle operation. The inventors of the present invention have recognized a critical area for the reduction of NVH in an internal combustion engine. In a chain driven overhead cam internal combustion engine, a chain guide assembly is typically rigidly mounted to the engine by a fastener, such as a bolt, to guide the chain through its course at the front-end of the engine. As the chain moves, chain induced vibration is transmitted through the chain guide assembly resulting in undesirable noise. Until now, there was no known assembly which effectively reduced chain related noise while maintaining limited chain guide deflection.

SUMMARY OF THE INVENTION

An object of the invention is to reduce chain related noise and vibration in a chain driven overhead cam internal combustion engine, while maintaining limited chain guide deflection.

The above object is achieved, and problems of prior art approaches overcome, by providing a novel chain guide mounting assembly for a chain driven overhead cam internal combustion engine. In one particular aspect of the invention, the chain guide mounting assembly includes a chain guide member fastened to the engine by vibration isolation means. The chain guide member has a chain guide surface for guiding the chain and is formed with a bore. A vibration isolation means is provided that includes first and second, substantially cylindrical resilient members. Each of the first and second resilient members have an exterior side wall, an axial bore therethrough, and a flanged portion at one end thereof. The members are fitted within the bore of the chain guide member such that an underside surface of each flange portion rests on opposite, outer surfaces of the chain guide member. A rigid, substantially cylindrical sleeve is fitted in interference engagement within the bores of both the first and second resilient members such that a radial preload is applied thereto. A fastener, passing through the sleeve and the bores, fastens the chain guide member to the engine such that an axial preload is applied to both the first and second resilient members.

An advantage of the above aspect of the invention is that chain related noise and vibration is reduced by a chain guide assembly having vibration isolation means.

Another advantage of the above aspect of the invention is that chain guide deflection is minimized, thereby reducing chain speed variation and the resulting stress on the chain guides, as well as maintaining consistent engine timing.

Yet another advantage of the above aspect of the invention is that a wide range of vibration frequencies are isolated.

Other objects, features and advantages of the present invention will be readily appreciated by the reader of this specification.

BRIEF DESCRIPTION OF THE DRAWINGS

The invention will now be described, by way of example, with reference to the accompanying drawings in which:

FIG. 2 is a diagrammatic exploded view of the chain guide mounting assembly according to the present invention;

FIG. 3 is an enlarged view of a portion of the chain guide mounting assembly encircled by line 3 of FIG. 1;

FIG. 5 is an exploded cross-sectional view of the chain guide mounting assembly of FIG. 4;

FIG. 5a is a cross-sectional view of a portion of the chain guide mounting assembly of FIG. 5 prior to assembly to the engine; and, FIG. 6 is an enlarged view a portion of a first resilient member, according to the present invention, encircled by line 6 of FIG. 5.

DETAILED DESCRIPTION OF THE PREFERRED EMBODIMENT

Figure 1:
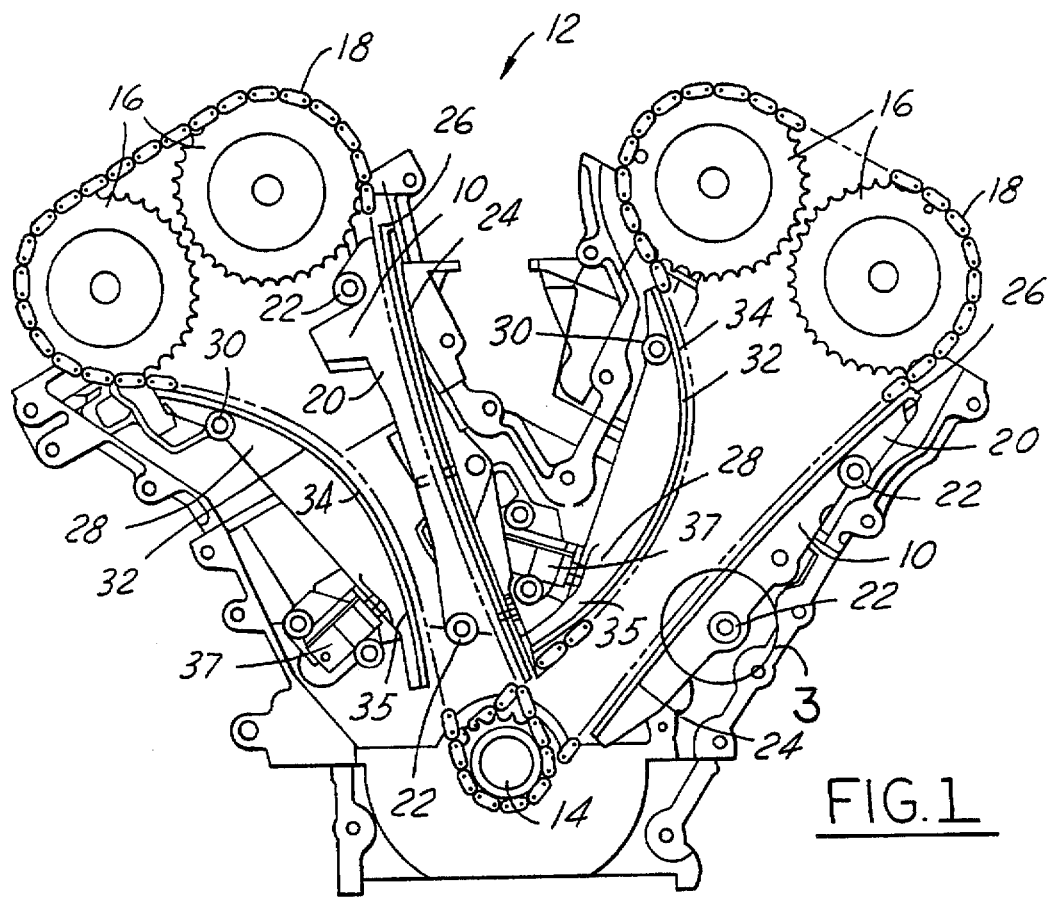
FIG. 1 is a diagrammatic plan view of a chain driven overhead cam internal combustion engine according to the present invention.

As shown in FIGS. 1 and 2, chain guide mounting assembly generally shown at 10 is mounted to internal combustion engine 12. In the example shown herein, two chain guide mounting assemblies are shown for a V-block internal combustion engine, one for each bank of cylinders. Those skilled in the art will recognize that the present invention may be applied to an in-line engine as well. Internal combustion engine 12 has crankshaft 14, overhead camshafts 16 and chain 18 connecting crankshaft 14 to overhead camshafts 16. As is known to one of ordinary skill in the art, crankshaft 14 and camshafts 16 each have a sprocket wheel attached to one end thereof so that chain 18 may transmit power from rotating crankshaft 14 to camshaft 16.

Chain guide mounting assembly 10 includes chain guide member 20 fastened to internal combustion engine 12. Chain guide member 20 is fastened to engine 12 by vibration isolation means 22, two of which are shown for each chain guide member 20 in this example. Chain guide member 20 further includes chain guide surface 24, which guides chain 18 along its path from crankshaft 14 to camshaft 16. Chain guide surface 24 typically includes elongate resilient member 26 mounted thereon to provide a smooth, substantially resistance-free, chain guide surface. In a preferred embodiment, elongate resilient member 26 is made of a thermally and environmentally stable material such as polyaryl-ether-ether-ketone (PEEK).

In order to apply tension on chain 18, a chain tensioning device is provided. In the example disclosed herein, the chain tensioning device includes chain tensioning member 28, which is a substantially elongate member having first end 30 pivotally mounted to engine 12, and force application means 37. Force application means 37 acts on second end 35 of chain tensioning member 28. In this example, force application means 37 is a hydraulically operated piston for applying a force at second end 35 so that chain tensioning member 28 pivots about first end 30. Thus, a lateral force is placed upon chain 18 so as to reduce slack therein. Alternatively, those skilled in the art will appreciate in view of this disclosure that a spring-loaded cylindrical chain tensioning device may be used, which serves the same purpose of reducing slack in chain 18. Chain support surface 32, which may also include elongate resilient member 34 made of PEEK, provides a smooth, substantially resistance-free, surface on which chain 18 rides.

In prior art devices, as chain 18 would rotate or move between crankshaft 14 and camshaft 16, any vibration generated therein would be transmitted through chain guide member 20 and then through the remainder of engine 12, thereby increasing undesirable noise. According to the present invention, vibration isolation means 22 is provided to mount chain guide member 20 to engine 12, thereby reducing the amount of undesirable noise. FIG. 3 represents an enlarged view of a portion of chain guide mounting assembly 10, encircled by line 3 of FIG. 1, showing one vibration isolation means 22. As previously noted, two vibration isolation means 22 are provided to mount each chain guide member 20 to engine 12. For the sake of clarity, however, only one vibration isolation means 22 is shown and described hereinafter.

Figure 4:
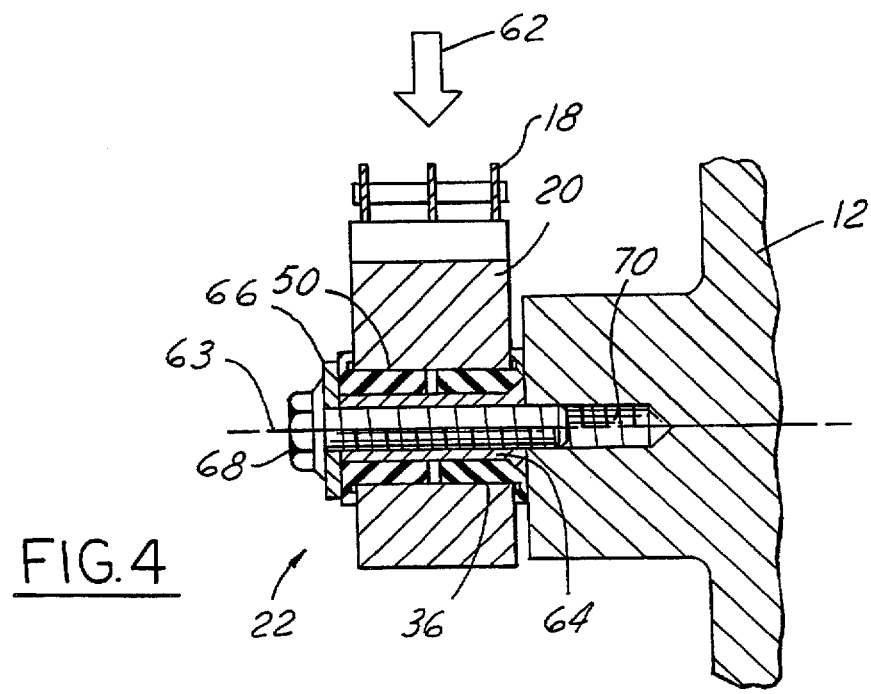
FIG. 4 is a cross-sectional view of the chain guide mounting assembly taken along line 4—4 of FIG. 3.

According to the present invention, as best shown in FIGS. 4 and 5, vibration isolation means 22 includes first resilient member 36 fitted within bore 38 of chain guide member 20. First resilient member 36 is substantially cylindrical and has exterior side wall axial bore 42 therethrough and flange portion 44 at one end thereof. First resilient member 36 is fitted within bore 38 such that underside surface 46 of flange portion 44 rests on outer surface 48 of chain guide member 20.

Vibration isolation means 22 also includes second resilient member 50 fitted within bore 38. Second resilient member 50 is also substantially cylindrical and has exterior side wall 52, axial bore 54 extending therethrough, and flange portion 56 at one end thereof. Second resilient member 50 is fitted within bore 38 such that underside surface 58 of flange portion 56 rests on outer surface 60 of chain guide member 20. In a preferred embodiment, first 36 and second 50 resilient members are made of an elastomeric material, preferably comprising fluorinated hydrocarbon or fluorosilicone.

As shown in FIG. 4, a lateral force, represented by arrow 62, is exerted by chain 18 onto chain guide member 20 due to the action of the chain tensioning device. As a result, vibration isolation means 22 may move in a lateral direction relative to axis 63 of vibration isolation means 22. In order to prevent an undesirable amount of movement, while maintaining vibration isolation, vibration isolation means 22 of the present invention includes rigid sleeve 64, such as a steel sleeve, in interference engagement within bores 42 and 54 of first resilient member 36 and second resilient member 50, respectively. The effect of the interference engagement results in a radial preload on both first and second resilient members 36 and 50, respectively, thereby reducing the amount of undesirable lateral movement. It is desirable to reduce lateral movement so as to provide the benefit of reducing speed variation of chain 18 and the resulting stress on chain guide member 20. Further, it is desirable to reduce lateral movement to maintain proper timing of engine 12. To complete the assembly, washer 66 overlays top surface 67 of flange portion 56. Fastener 68, such as a bolt, passes through washer 66, sleeve 64 and bores 42 and 54 of first resilient member 36 and second resilient member 50 and is fastened within threaded hole 70 of engine 12. To further reduce lateral movement, an axial preload is also applied to vibration isolation means 22. As shown in FIG. 5a, which is a cross-sectional view of a portion of the chain guide mounting assembly of FIG. 5 prior to assembly to the engine, rigid sleeve 64 has an axial length $L_s$ less than the length $L_R$ of first and second resilient members 36, 50 when fitted within bore 38. As a result, when fastener 68 (FIG. 5) is tightened, first and second resilient members 36, 50 compress in an axial direction, thereby providing the axial preload.

In a preferred embodiment, sleeve 64 has flange portion 72 at one end thereof to provide a greater bearing surface on engine 12. Engine 12 may be made of aluminum and thus flange portion 72 decreases the resulting bearing stress to reduce the likelihood of damage to engine 12. To accommodate flange portion 72, first resilient member 36 has annular recess 74 located about bore 42, as best shown in FIG. 6. In the example shown herein, flange portion 72 of sleeve 64 and annular recess 74 of first resilient member 36 each form a frusto-conical surface thereby providing a maximum amount of force distribution between sleeve 64 and first resilient member 36.

As fastening means 68 is tightened so as to compress first resilient member 36 and second resilient member 50, an area of concentrated stress rises in the location generally shown at 76 of FIG. 6. To reduce the likelihood of a tear in that area, both first resilient member 36 and second resilient member 50 are each provided with annular recess 78 in underside surfaces 46 and 58, respectively. FIG. 6 shows recess 78 in first resilient member 36 only. Annular recess 78 is located near the boundary between flange portion 44 and side wall 40. Similarly, second resilient member 50 includes annular recess 78 in underside surface 58 of flange 56 near a boundary between flange 56 and side wall 52.

While the best mode in carrying out the invention has been described in detail, those having ordinary skill in the art in which this invention relates will recognize various alternative designs and embodiments, including those mentioned above, in practicing the invention that have been defined by the following claims.

We claim:

1. A chain guide mounting assembly for an internal combustion engine having a crankshaft, a camshaft, and a chain connecting said crankshaft to said camshaft, said assembly comprising:

an elongate chain guide member fastened to said engine by vibration isolation means, said chain guide member having a first end with a first bore formed therein and a second end, opposite said first end, with a second bore formed therein and a chain guide surface for guiding said chain, with said first and second bores receiving first and second vibration isolation means, respectively, with each said vibration isolation means comprising:

a first, substantially cylindrical resilient member having an exterior side wall, an axial bore therethrough and a flange portion at one end thereof fitted within one of said bores formed in said chain guide member such that an underside surface of said flange portion rests on a first outer surface of said chain guide member;

a second, substantially cylindrical resilient member having an exterior side wall, an axial bore therethrough and a flange portion at one end thereof fitted within said one of said bores formed in said chain guide member such that an underside surface of said flange portion rests on a second outer surface of said chain guide member;

a rigid, substantially cylindrical sleeve in interference engagement within said bores of said first and said second resilient members such that a radial preload is applied to said first and second resilient members; and, a fastener passing through said sleeve and said bores for fastening said chain guide member to said engine.

2. A chain guide mounting assembly according to claim 1 further comprising a chain tensioning device for applying tension on said chain to reduce chain slack therein.

3. A chain guide mounting assembly according to claim 2 wherein said chain tensioning device comprises:

an elongate chain tensioning member having a first end, a second end opposite said first end and a chain support surface intermediate said first and second ends for supporting said chain, said first end being pivotally connected to said engine; and, a force application means engaging said second end such that when a force is applied by said force application means, said chain tensioning member pivots about said first end thereby applying a lateral force at said chain support surface on said chain that serves to reduce slack in said chain.

4. A chain guide mounting assembly according to claim 3 wherein an elongate resilient member is mounted to said chain support surface.

5. A chain guide mounting assembly according to claim 1 further comprising a washer overlaying a top surface of said flange portion of said second resilient member.

6. A chain guide mounting assembly according to claim 1 wherein said first and second resilient members each comprise a material selected from the group consisting of a fluorinated hydrocarbon and a fluorosilicone.

7. A chain guide mounting assembly according to claim 1 wherein an elongate resilient member is mounted to said chain guide surface.

8. A chain guide mounting assembly according to claim 1 wherein said sleeve has an axial length less than the length of said first and second resilient members when fitted within said one of said bores formed in said chain guide member such that an axial preload is applied to said first and second resilient members when said chain guide member is mounted to said engine.

9. A chain guide mounting assembly according to claim 1 wherein said sleeve comprises a flanged portion at one end thereof for bearing against the engine.

10. A chain guide mounting assembly according to claim 9 wherein said first resilient member has an annular recess about said bore at said flange portion end for receiving said flange portion of said sleeve.

11. A chain guide mounting assembly according to claim 10 wherein said flange portion of said sleeve is a frusto-conical flange and said annular recess about said bore is a frusto-conical recess.

12. A chain guide mounting assembly according to claim 1 wherein said first resilient member comprises an annular recess in an underside surface of said flange portion of said first resilient member near a boundary between said flange portion and said exterior side wall.

13. A chain guide mounting assembly according to claim 1 wherein said second resilient member comprises an annular recess in an underside surface of said flange portion of said first resilient member near a boundary between said flange portion and said exterior side wall.

14. A chain guide mounting assembly for an internal combustion engine having a crankshaft, an overhead camshaft, and a chain connecting said crankshaft to said camshaft, said assembly comprising:

a chain tensioning device for applying tension on said chain to reduce chain slack therein, said device comprising:

an elongate chain tensioning member having a first end, a second end opposite said first end and a chain support surface intermediate said first and second ends and having an elongate resilient member mounted on said chain support surface for supporting said chain, said first end being pivotal connected to said engine; and, a force application means engaging said second end such that when a force is applied by said force application means, said chain tensioning member pivots about said first end thereby applying a lateral force at said chain support surface on said chain that serves to reduce slack in said chain;

an elongate chain guide member fastened to said engine by vibration isolation means, said chain guide member having a first end with a first bore for receiving a first vibration isolation means, a second end, opposite said first end, with a second bore for receiving a second vibration isolation means, a chain guide surface intermediate said first and second ends and having an elongate resilient member mounted on said chain guide surface for guiding said chain, and further having a vibration isolation means, with said vibration isolation means comprising:

a first, substantially cylindrical resilient member comprising:
 i) an exterior side wall,
 ii) an axial bore through said member,
 iii) a flange portion at one end thereof, said first resilient member fitted within said first bore of said chain guide member such that an underside surface of said flange portion rests on a first outer surface of said chain guide member,
 iv) a frusto-conical annular recess about said bore at said flange portion end, and
 v) an annular recess in an underside surface of said flange portion near a boundary between said flange portion and said exterior side wall;

a second, substantially cylindrical resilient member comprising:
 i) an exterior side wall,
 ii) an axial bore through said member,
 iii) a flange portion at one end thereof, said second resilient member fitted within said second bore of said chain guide member such that an underside surface of said flange portion rests on a second outer surface of said chain guide member, and,
 iv) an annular recess in an underside surface of said flange portion near a boundary between said flange portion and said exterior side wall;

a rigid, substantially cylindrical sleeve in interference engagement within said bores of said first and said second resilient members such that a radial preload is applied to said first and second resilient members, said sleeve having a frusto-conical flange portion at one end thereof for bearing against the engine, said sleeve further having an axial length less that the length of said first and second resilient members when fitted within said bore of said chain guide member;

a washer overlaying a top surface of said flange portion of said second resilient member;

a fastener passing through said sleeve and said bores for fastening said chain guide member to said engine such that an axial preload is applied to said first and second resilient members when said chain guide member is mounted to said engine; and, wherein said first and second resilient members each comprise a material selected from the group consisting of a fluorinated hydrocarbon and a fluorosilicone.

15. A method of mounting a chain guide member to an internal combustion engine having a crankshaft, an overhead camshaft, and a chain connecting said crankshaft to said camshaft, said method comprising the steps of:

forming a chain guide member with a chain guide surface for guiding said chain;

fastening said chain guide member to said engine using vibration isolation means comprising the steps of:

fitting a first, substantially cylindrical, resilient member having an exterior side wall, an axial bore therethrough and a flange portion at one end thereof within a bore formed in said chain guide member such that an underside surface of said flange portion rests on a first outer surface of said chain guide member;

fitting a second, substantially cylindrical, resilient member having an exterior side wall, an axial bore therethrough and a flange portion at one end thereof within said bore of said chain guide member such that an underside surface of said flange portion rests on a second outer surface of said chain guide member;

radially preloading said first and second resilient members by engaging a rigid, substantially cylindrical sleeve in an interference fit within said bores of said first and said second resilient members; and, fastening said chain guide member to said engine by passing a fastener through said sleeve and said bores.

16. A method according to claim 15 further comprising the steps of:

forming said sleeve member with a flanged portion at one end thereof for bearing against the engine;

forming said first resilient member with an annular recess about said bore at said flange portion end for receiving said flange portion of said sleeve.

17. A method according to claim 15 wherein said forming step comprises the steps of:

forming an elongate chain guide member;

forming a first bore in a first end of said chain guide member for receiving a first vibration isolation means; and, forming a second bore in a second end of said chain guide member opposite said first end for receiving a second vibration isolation means.

18. A method according to claim 15 further comprising the steps of forming an annular recess in each underside surface of said flange portions of said first and said second resilient members near a boundary between said flange portions and said exterior walls.

19. A method according to claim 15 further comprising the step of axially preloading said first and second resilient members.

* * * * *